United States Patent [19]

White

[11] Patent Number: 4,709,750

[45] Date of Patent: Dec. 1, 1987

[54] PHASE CHANGE HEAT EXCHANGER

[75] Inventor: Geoffrey T. White, Omaha, Nebr.

[73] Assignee: InterNorth, Inc., Omaha, Nebr.

[21] Appl. No.: 850,027

[22] Filed: Apr. 10, 1986

[51] Int. Cl.⁴ .............................................. F28D 17/00
[52] U.S. Cl. ........................................ 165/10; 165/78; 126/400
[58] Field of Search .................... 165/10, 78; 126/400, 126/436

[56]  References Cited
U.S. PATENT DOCUMENTS

| 3,960,207 | 6/1976 | Boer ..................................... | 165/10 |
| 4,114,600 | 9/1978 | Newton ............................... | 165/10 |
| 4,248,291 | 2/1981 | Jarmul ................................. | 165/10 |
| 4,347,892 | 9/1982 | Clyne et al. ......................... | 165/10 |

FOREIGN PATENT DOCUMENTS

| 2407434 | 6/1979 | France ................................. | 165/10 |
| 24188 | 2/1984 | Japan .................................. | 165/10 |
| 41793 | 3/1984 | Japan .................................. | 165/10 |
| 71988 | 4/1984 | Japan .................................. | 165/10 |

Primary Examiner—Albert W. Davis, Jr.
Attorney, Agent, or Firm—Zarley, McKee, Thomte, Voorhees & Sease

[57]  ABSTRACT

This invention is a phase change heat exchange unit which is comprised of upper and lower skeletal support frames having a container for a phase change material disposed therebetween. Each of the frames has a pair of support grids which provide support for the phase change material container and provide a passage for the flow of a heat transfer fluid therethrough so that it can come into direct contact with the container.

2 Claims, 6 Drawing Figures

U.S. Patent    Dec. 1, 1987    Sheet 1 of 2    4,709,750
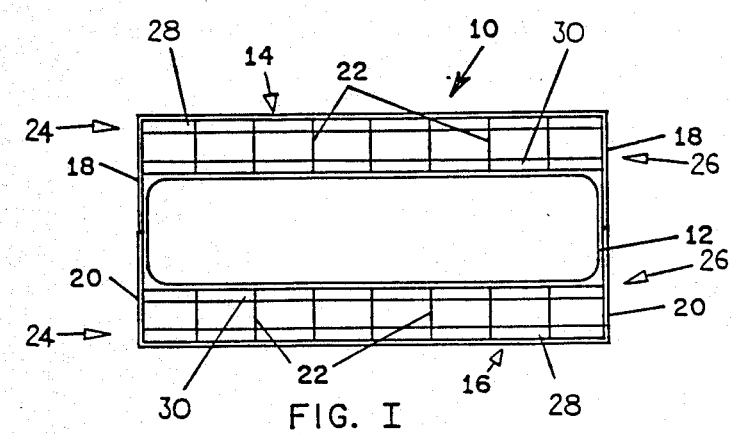
FIG. I
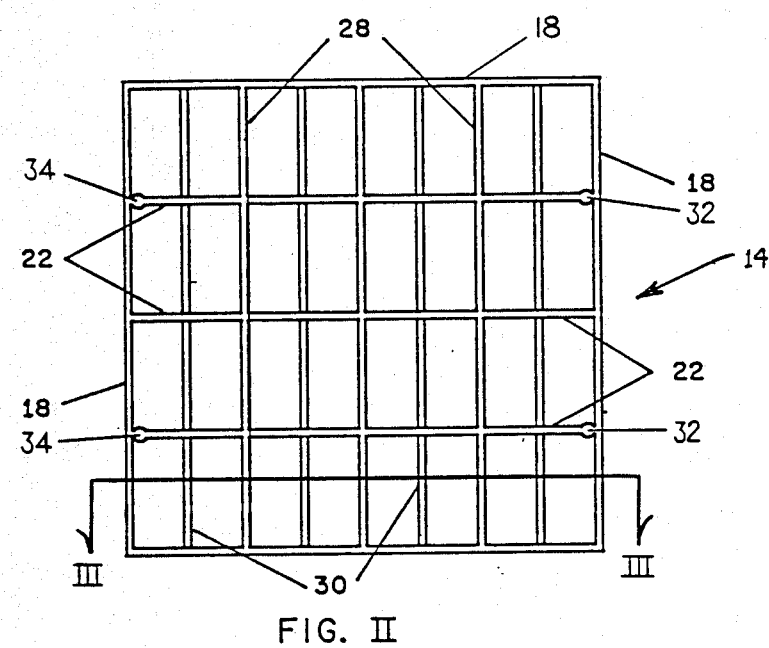
FIG. II
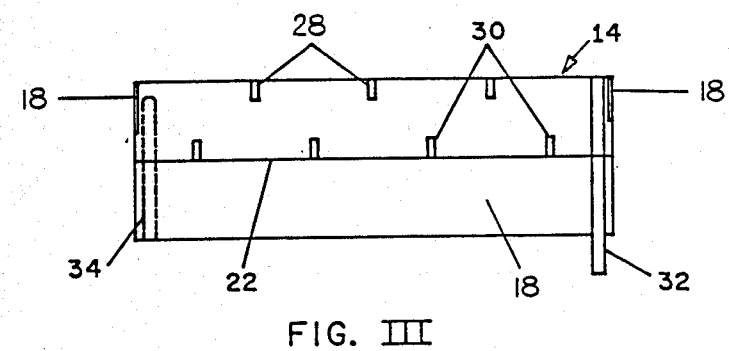
FIG. III

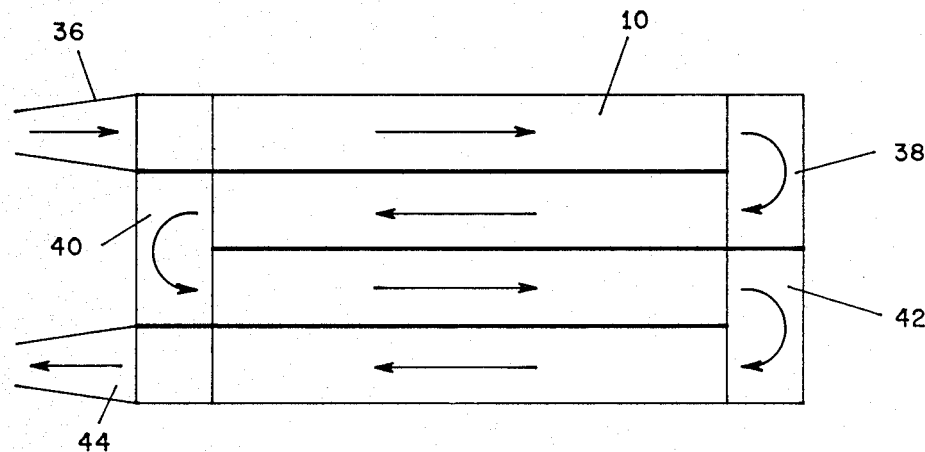
FIG. IV
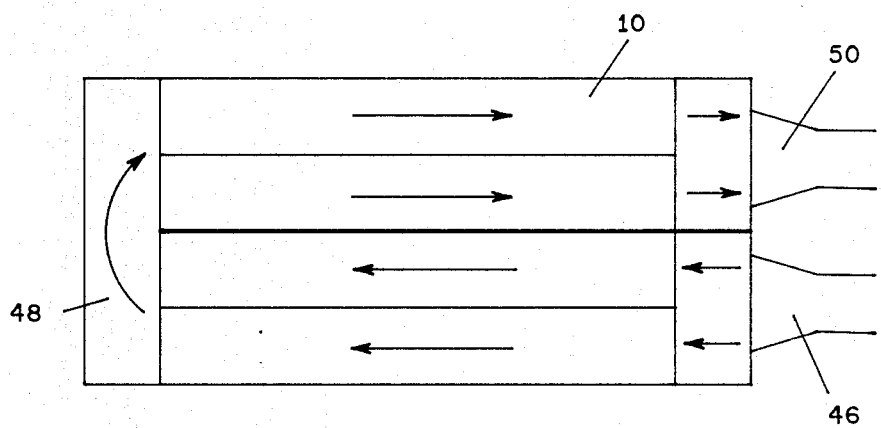
FIG. V
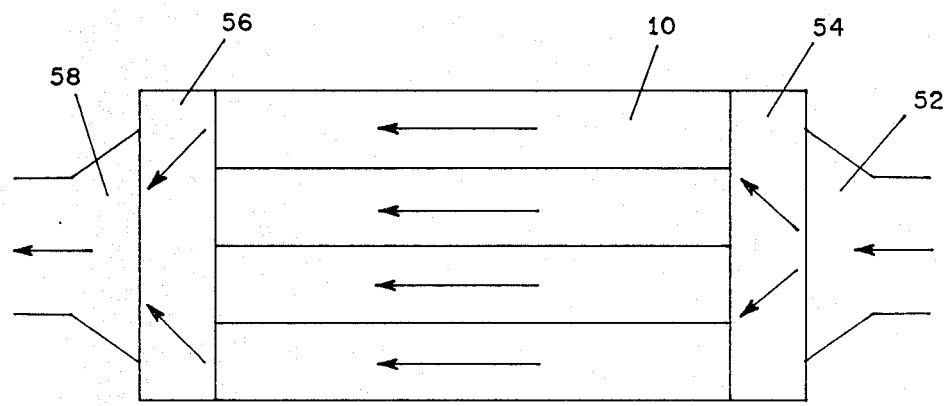
FIG. VI

PHASE CHANGE HEAT EXCHANGER

BACKGROUND OF THE INVENTION

This invention relates to a novel heat exchanger which incorporates a phase change material as an integral part of the unit. More particularly, this invention relates to a relatively inexpensive, lightweight and structurally strong phase change heat exchanger unit which can be used in series, parallel and/or stacked array to provide any desired amount of heat storage and/or heat exchange.

Many heat exchangers suffer from the disadvantage that they are constructed of heavy structurally strong materials and must be assembled in a particular size in the factory. Such heat exchangers which use phase change materials suffer from further disadvantage of high transportation costs for the relatively heavy phase change material if it is formed as part of the heat exchanger in the factory or with having to handle the phase change material and insert it into the unit when it is placed in service. Such heat exchangers allow the user little or no flexibility in changing the size or capacity of the heat exchanger after it is placed in service.

It is an object of the present invention to provide a phase change heat exchange unit which will provide the user with maximum flexibilty in initially designing and later changing the size and capacity of the heat exchange device in which the unit is used. It is a further object of the present invention to provide a relatively lightweight inexpensive phase change heat exchange unit. Another object is to allow ease of handling of the phase change material.

SUMMARY OF THE INVENTION

This invention is a phase change heat exchange unit which is comprised of upper and lower skeletal support frames. These skeletal support frames have opposing side walls wherein the upper frame is supported on the lower frame at oppositely facing edges of the side walls. Extending between the side walls remote from the oppositely facing side wall edges are at least two spaced apart grid supports which form an air passage therebetween. The grid supports are formed by a plurality of cross support beams extending between the side walls and a plurality of vertical spacers extending parallel to the side walls and intersecting and supporting the cross support beams. There is also a means for securing the upper and lower frames together. Finally, there is a container filled with phase change material disposed between the upper and lower frames and supported thereby. The container is preferably formed of a flexible lightweight material and the upper and lower frames are preferably formed of a lightweight structurally strong material.

BRIEF DESCRIPTION OF THE DRAWINGS

FIG. I is a side view showing the phase change material container in place between the upper and lower frames.

FIG. II is a top view of the device of the present invention.

FIG. III is a cross-section taken across line III—III in FIG. II.

FIGS. IV, V and VI are schematic views showing different arrangements of several units made according to the present invention and illustrating the heat exchange fluid flow path therethrough.

DETAILED DESCRIPTION OF THE INVENTION

The upper and lower skeletal support frames may be made of any rigid material which is relatively structurally strong and which can be formed into a skeletal support arrangement with the grid supports as described herein. However, it is preferred that the frames themselves be made of plastic, especially polypropylene or any other plastic compatible with heat exchange fluid. The plastic materials provide an excellent balance of strength versus cost and are also lightweight for easy transportation and arrangement and rearrangement of the heat exchanger configuration.

The container for the phase change material may be made of any material which provides good heat exchange between the exterior and interior of the container. However, it is preferred that the container be made of a flexible lightweight plastic material, especially polypropylene or polyvinylchloride. The flexibility of the container material allows the container to be used in different configurations and also to be more easily inserted into and removed from the skeletal support frames. The use of such a container provides an easy and relatively trouble-free method of handling the phase change material.

Any phase change material may be used in the present invention. There are a number of well known phase change materials which have been used in heat exchange units in the past. These include polyethylene glycol, water, salt hydrates, parafins, and mixed alkyl hydrocarbons. The mixed alkyl hydrocarbons are preferred for use in the present invention because it has a high heat capacity and phase change can be obtained at approximately 48° F. Other materials may be preferable at different temperatures.

Referring to FIG. I, the phase change heat exchange unit 10 is comprised of a phase change material container 12 disposed between upper skeletal support frame 14 and lower skeletal support frame 16. The side walls 18 of the upper frame 14 are supported on the side walls 20 of the lower frame 16 at opposing edges thereof. Vertical spacers 22 provide side support for the frames 14 and 16 to prevent them from twisting. First grids 24 provide additional structural support for the frames 14 and 16 and second grids 26 provide direct support for the container 12. It can be seen that the first and second grids, 24 and 26, together with the vertical spacers 22 form passages for flow of a heat transfer fluid through the unit 10. The open nature of the grids 26 allows direct contact between the heat exchange fluid and the phase change material container 12.

FIG. II is a top view of the unit 10 illustrating the upper frame 14 which is comprised of the first grid cross beams 28, second grid cross beams 30, the side walls 18 and the vertical spacers 22. FIG. III shows a cross-sectional view taken along lines III—III of FIG. II wherein part of the side walls 18 and 20 have been cut away and the lower skeletal support frame 16 is not shown. There is provided a male interlocking pin section 32 and a female interlocking pin section 34. The lower frame 16 will have a female pin section 34 opposing the male pin section 32 and a male pin section 32 opposing the female pin section 34. When the upper skeletal support frame 14 is placed on top of the lower skeletal support frame 16, the male pin section 32 is inserted into the female pin section 34 to lock the two frames, 14 and 16, together and prevent them from moving sidewise with respect to each other.

FIG. IV illustrates an embodiment of the present invention wherein four phase change heat exchange units 10 are used in a stacked array of one on top of the other to provide a heat exchanger which has a serpentine flow path. Heat exchange fluid enters through inlet 36 and flows through the first unit 10 to the first manifold 38 which directs the heat exchange fluid back through the second unit 10 to the second manifold 40 which then directs the fluid back through the third unit 10 to the third manifold 42. The fluid is there directed back through the fourth unit 10 and out of the outlet 44.

In another embodiment as shown in FIG. V, heat exchange fluid from inlet 46 flows through two units 10 to a manifold 48 which directs the fluid flow back through the upper two units 10 and out through the outlet 50. The embodiment of FIG. VI shows how heat exchange fluid enters through inlet 52 and is distributed by a first manifold 54 to all four units 10. The fluid flows directly through all four units 10 in parallel to the second manifold 56 which directs the fluid out through outlet 58.

A model of the phase change heat exchanger of the present invention was constructed using six units as described above. Two units each were stacked on top of each other and the three pairs were lined up in series. This arrangement provides both the axial and the vertical heat exchange characteristics. The entering and exiting air temperature was measured versus time and the storage and discharge capacity of the test unit was determined by the integration of the area between two curves of the entering and exiting air temperature with time and multiplied by the air flow rate, the specific heat of the air, and the density of the air. The storage efficiency of the unit was determined by the ratio of the discharge capacity to the storage capacity. In the present instance, the storage efficiency of the test model was approximately 90%.

The temperature distribution within the heat exchanger was measured by three thermocouples. One was located inside the storage medium within the container. Another was located at the front end of the exchanger and the third was located at the rear of the exchanger. There was very little difference between the temperatures measured by the three thermocouples over the time of operation of the exchanger. This is another indication of the high efficiency of the heat transfer within the exchanger.

I claim:

1. A phase change heat exchange unit which comprises:
    (a) upper and lower skeletal support frames having
        (i) opposing side walls wherein the upper frame is supported on the lower frame at oppositely facing edges of the side walls,
        (ii) at least two spaced apart grid supports forming an air passage therebetween and extending between the side walls remote from said oppositely facing side wall edges, said grid supports formed by a plurality of cross support beams extending between the side walls and a plurality of vertical spacers extending parallel to the side walls and intersecting and supporting said cross support beams, and
        (iii) means for securing the upper and lower frames together, and
    (b) a container filled with a phase change material disposed between the upper and lower frames and supported thereby.

2. The unit of claim 1 wherein the container is formed of a flexible lightweight material and the upper and lower frames are formed of a lightweight structurally strong material.

* * * * *